(12) United States Patent
Anderl

(10) Patent No.: US 11,718,278 B2
(45) Date of Patent: *Aug. 8, 2023

(54) LOW PROFILE WHEEL CHOCK

(71) Applicant: International Business Machines Corporation, Armonk, NY (US)

(72) Inventor: William James Anderl, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 428 days.

This patent is subject to a terminal disclaimer.

(21) Appl. No.: 16/824,416

(22) Filed: Mar. 19, 2020

(65) Prior Publication Data

US 2021/0146892 A1    May 20, 2021

Related U.S. Application Data

(63) Continuation-in-part of application No. 16/687,901, filed on Nov. 19, 2019.

(51) Int. Cl.
   *B60T 3/00* (2006.01)

(52) U.S. Cl.
   CPC ..................... *B60T 3/00* (2013.01)

(58) Field of Classification Search
   CPC .. B60T 3/00; B64F 1/16; E01F 13/065; E01F 13/044
   USPC .................................................. 188/4 R, 36
   See application file for complete search history.

(56) References Cited

U.S. PATENT DOCUMENTS

| | | | | |
|---|---|---|---|---|
| 2,661,817 A | * | 12/1953 | Mullins | B60T 3/00 104/44 |
| 2,671,533 A | | 3/1954 | Taylor | |
| 3,425,517 A | | 2/1969 | Speir | |
| 3,542,157 A | | 11/1970 | Frederick | |
| 3,785,517 A | | 1/1974 | Brajkovich | |
| 3,838,391 A | * | 9/1974 | Mintz | G08G 1/02 404/6 |

(Continued)

FOREIGN PATENT DOCUMENTS

EP    1112950 A1    7/2001

OTHER PUBLICATIONS

Anderl et al., "Low Profile Wheel Chock," U.S. Appl. No. 16/687,901, filed Nov. 19, 2019.

(Continued)

*Primary Examiner* — Nicholas J Lane
(74) *Attorney, Agent, or Firm* — Kelli D. Morin

(57) ABSTRACT

Provided is a chocking device, including a frame, a plate, and a stop. The frame has an uppermost surface and a lowermost surface opposite the uppermost surface. The plate has a contact surface and is movable between a first position, wherein a portion of the contact surface is substantially coextensive with the uppermost surface of the frame, and a second position, wherein the portion of the contact surface is between the uppermost and lowermost surface of the frame. The stop is coupled to the frame and arranged in direct contact with the plate. The stop is rotatable such that movement of the plate from the first position to the second position rotates the stop from a first to a second stop position. The plate is movable such that the contact surface is substantially parallel when the plate is in the first and second positions.

17 Claims, 9 Drawing Sheets

(56) References Cited

U.S. PATENT DOCUMENTS

| | | | |
|---|---|---|---|
| 4,676,344 A * | 6/1987 | Locicero | E01F 13/08 |
| | | | 188/4 R |
| 6,164,893 A | 12/2000 | Glomot et al. | |
| 8,696,272 B1 | 4/2014 | Ragland | |
| 10,328,910 B2 | 6/2019 | Edgeworth et al. | |
| 2011/0181240 A1* | 7/2011 | Baarman | B60L 53/65 |
| | | | 320/108 |
| 2011/0233154 A1 | 9/2011 | St. Louis | |
| 2014/0238121 A1 | 8/2014 | Bonacini | |
| 2018/0272882 A1 | 9/2018 | Fontana et al. | |

OTHER PUBLICATIONS

Google, "Unique Wheel Chocks," https://www.google.com/search?client=firefox-b-1-d&channel=tus&tbm=shop&q=unique+wheel+chocks&spell=1&sa=X&ved=0ahUKEwiW9OGJo_3hAhWmm-AKHekXAjEQBQiwAigA&biw=1858&bih=1104, printed Aug. 7, 2019, 5 pgs.

Kelley, "Automatic Wheel Restraints," https://www.beuschelsales.com/wp-content/uploads/2013/10/Automatic-wheel-chocks-literature.pdf, 4 pgs., accessed Jul. 2019.

List of IBM Patents or Patent Applications Treated as Related, Mar. 19, 2020, 2 pgs.

Plasticade, "Aircraft Wheel Chocks—Wheel Chocks," http://www.plasticade.com/traffic_safety/wheel_chocks/aircraft_chocks, printed Aug. 7, 2019, 2 pgs.

* cited by examiner

LOW PROFILE WHEEL CHOCK

BACKGROUND

The present disclosure relates generally to the field of safety equipment for wheel immobilization, and more particularly to wheel chocks.

Wheel chocks are safety equipment used to prevent accidental movement of a vehicle or other piece of machinery. Wheel chocks include a raised surface placed near to or against the front and/or back surface of one or more wheels of the vehicle, orthogonal to the direction of movement of the wheel. The raised surface increases the amount of force necessary for the wheel to roll to overcome the height difference, which prevents unintended rolling of the wheel.

SUMMARY

Embodiments of the present disclosure include a chocking device. The chocking device includes a frame having an uppermost surface and a lowermost surface. The lowermost surface is arranged opposite the uppermost surface. The chocking device further includes a plate having a contact surface. The plate is movable between a first plate position, wherein a portion of the contact surface is arranged substantially coextensively with the uppermost surface of the frame, and a second plate position, wherein the portion of the contact surface is arranged between the uppermost surface and the lowermost surface of the frame. The chocking device further includes a stop coupled to the frame and arranged in direct contact with the plate. The stop is rotatable such that movement of the plate from the first plate position to the second plate position rotates the stop from a first stop position to a second stop position. The plate is movable such that the contact surface when the plate is in the first plate position is substantially parallel to the contact surface when the plate is in the second plate position.

In accordance with at least one embodiment of the present disclosure, a chocking device includes a frame having an uppermost surface and a lowermost surface. The lowermost surface is arranged opposite the uppermost surface. The chocking device further includes a plate having a contact surface. The plate is movable between a first plate position, wherein the contact surface is arranged substantially coextensively with the uppermost surface, and a second plate position, wherein the contact surface is arranged between the uppermost surface and the lowermost surface. The chocking device further includes a stop rotatably coupled to the frame. The stop has an operating portion arranged nearer to the lowermost surface than the plate is to the lowermost surface when the plate is in the first plate position such that movement of the plate from the first plate position to the second plate position moves the operating portion.

In accordance with at least one embodiment of the present disclosure, a chocking device includes a frame having an uppermost surface, a lowermost surface, and a plurality of sides. Each side extends from the uppermost surface to the lowermost surface, and each side includes at least one slot angled from the uppermost surface toward the lowermost surface. The chocking device further includes a plate including a plurality of tabs. Each tab is arranged and configured so as to extend into a respective slot of the frame. The plate has a substantially planar contact surface. The plate is movable between a first plate position, wherein a portion of the contact surface is arranged substantially coextensively with the uppermost surface of the frame, and a second plate position, wherein the portion of the contact surface is arranged between the uppermost surface and the lowermost surface of the frame. The chocking device further includes a stop mechanism coupled to the frame and arranged in direct contact with the plate such that movement of the plate from the first plate position to the second plate position moves the stop mechanism.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
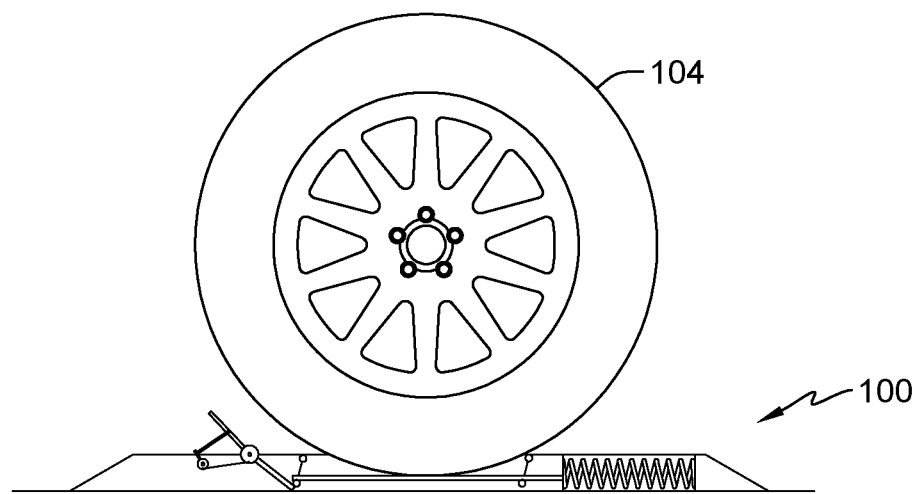
FIG. 1 illustrates an example use of an embodiment of the chocking device, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of wheel chocks, and in particular to wheel chocks having a minimal profile relative to the surface on which they are being used. While the present disclosure is not necessarily limited to such applications, various aspects of the disclosure may be appreciated through a discussion of various examples using this context.

Depending on the circumstances and environments in which they are being used, wheel chocks may have a variety of different features. For example, some wheel chocks are used for aircraft tires to prevent a parked aircraft from moving while being serviced or until the aircraft is ready to be moved again. Such wheel chocks are portable, rather than fixed, to accommodate different wheel bases of different aircrafts and/or different positions of different aircraft tires on the tarmac. The portability of such wheel chocks also helps eliminate unnecessary obstacles from the aircraft during movement. Additionally, the size and materials of such wheel chocks are selected to enable portability, typically by one person, while also providing an appropriately difficult obstacle for an aircraft wheel to move or roll over. Such wheel chocks may be unwieldy, and repositioning such wheel chocks for each aircraft requires additional resources, such as trained staff. Additionally, when such wheel chocks are not in use, they must be stored, which requires space, and must also be easily findable when they are needed again.

Wheel chocks are also commonly used in automobile service garages to prevent movement of vehicles while service and maintenance are being performed. Such wheel chocks may be immovably installed in service garages due to the consistent positioning of the automobiles within the garage. Additionally, automobiles typically have standardized wheel bases such that the relative positioning of wheels is predictable. Accordingly, such wheel chocks may be fixed to the garage floor and/or recessed within the garage floor.

Fixing wheel chocks to the garage floor introduces an immovable obstacle to the garage floor, which may create a tripping hazard or may be unintentionally deployed by other wheels or objects moving on the garage floor. Furthermore, recessing wheel chocks within the garage floor makes the location and position of the wheel chocks permanent, removing any flexibility. Additionally, the installation of such recessed wheel chocks may be an expensive procedure.

Embodiments of the present disclosure may overcome the above, and other, problems by using a deployable wheel chock that has a minimal profile relative to the surface on which it is being used. The low profile of embodiments of the wheel chock disclosed herein has a reduced tripping hazard relative to other wheel chocks used on top of a surface. Additionally, the low profile of embodiments of the wheel chock disclosed herein has improved portability relative to wheel chocks which are recessed into the ground. As described in further detail below, the low profile of embodiments of the wheel chock disclosed herein is achieved by an overlapping deployment mechanism which provides a compact and robust solution.

Figure 2:
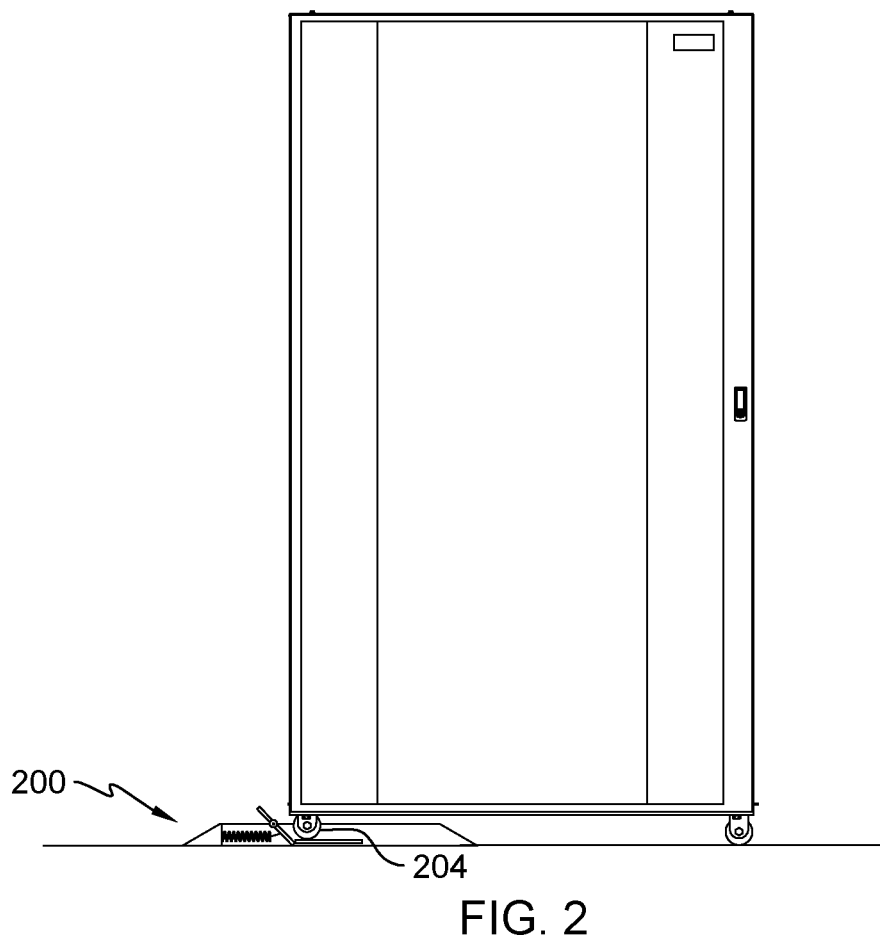
FIG. 2 illustrates another example use of an embodiment of the chocking device, in accordance with embodiments of the present disclosure.

As shown in FIG. 1, the low profile wheel chock 100 may be configured for use with a wheel or tire 104, such as that of an automobile. Alternatively, as shown in FIG. 2, the low profile wheel chock 200 may be configured for use with a wheel or tire 204, such as that of a server rack. These use examples are provided for illustrative purposes only and indicate that the embodiments of the wheel chock disclosed herein can be sized and dimensioned to accommodate a variety of uses. In any case, as described in more detail below, the overlapping deployment mechanisms of the embodiments of the wheel chock disclosed herein provide a versatile low profile wheel chock.

It is to be understood that the aforementioned advantages are example advantages and should not be construed as limiting. Embodiments of the present disclosure can contain all, some, or none of the aforementioned advantages while remaining within the spirit and scope of the present disclosure.

Referring now to FIGS. 3A-3E, illustrated is an example of a low profile wheel chock 300, in accordance with embodiments of the present disclosure. The low profile wheel chock 300 includes a frame 302, a plate 304, a deployment mechanism 306, a stop mechanism 308, a lock mechanism 310, and a return mechanism 312. As described in further detail below, depression of the plate 304 by a wheel or tire, for example wheel or tire 104 or 204 shown in FIGS. 1 and 2, respectively, operates the deployment mechanism 306, the stop mechanism 308, the lock mechanism 310, and the return mechanism 312, thereby deploying the wheel chock 300.

Figure 3A:
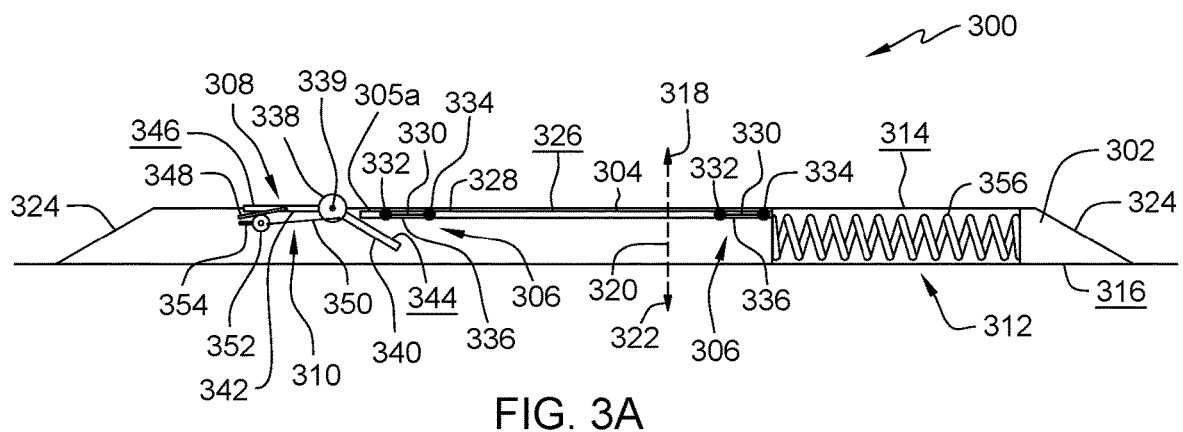
FIG. 3A illustrates a side view of an example embodiment of the chocking device in an undeployed configuration, in accordance with embodiments of the present disclosure.
Figure 3B:
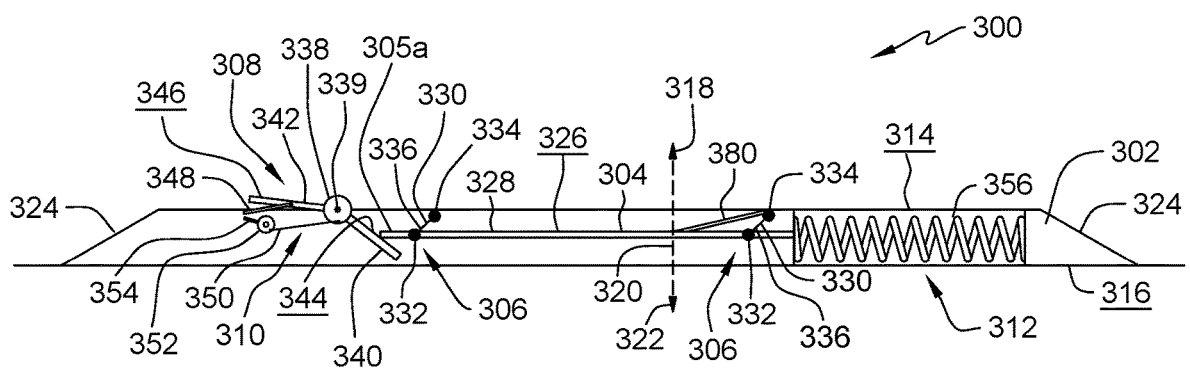
FIG. 3B illustrates a side view of the example embodiment of the chocking device of FIG. 3A in an intermediate configuration, in accordance with embodiments of the present disclosure.
Figure 3C:
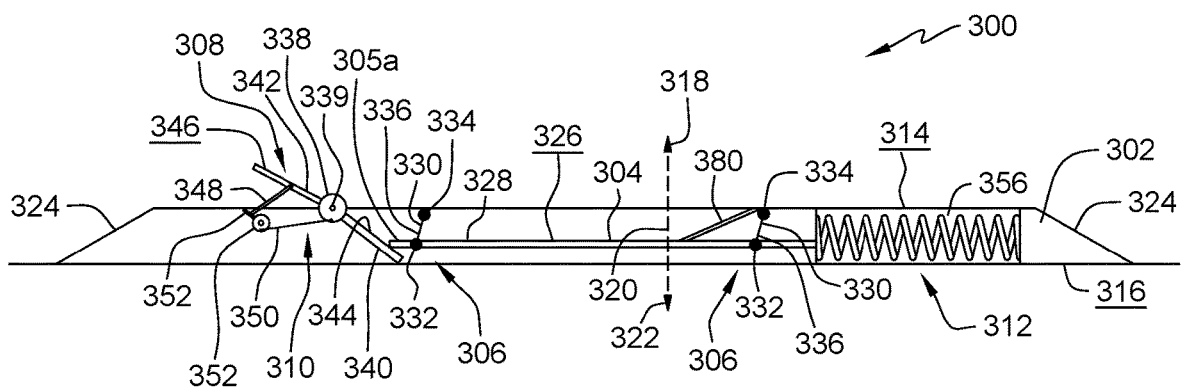
FIG. 3C illustrates a side view of the example embodiment of the chocking device of FIG. 3A in a deployed configuration, in accordance with embodiments of the present disclosure.

The frame 302 includes an uppermost surface 314 and a lowermost surface 316. As used herein, the term "uppermost surface" refers to a continuous layer arranged at the greatest vertical extent in an upward direction along a vertical axis, and the term "lowermost surface" refers to a continuous layer arranged at the greatest vertical extent in a downward direction along the vertical axis. Accordingly, as shown in FIGS. 3A-3C, the uppermost surface of the frame 302 is that continuous layer of the frame 302 arranged at the greatest vertical extent of the frame 302 in an upward direction 318 along a vertical axis 320 of the wheel chock 300, and the lowermost surface of the frame 302 is that continuous layer of the frame 302 arranged at the greatest vertical extent of the frame 302 in a downward direction 322 along the vertical axis 320. In other words, the lowermost surface 316 is arranged opposite the uppermost surface 314 along the vertical axis 320 of the wheel chock 300. The lowermost surface of the frame 302 is in contact with the ground or the surface on which the wheel chock 300 is placed for use.

The height of the wheel chock 300 is the distance between the lowermost surface 316 and the uppermost surface 314. Minimizing the height of the wheel chock 300 contributes to the advantages of the present disclosure by minimizing the profile of the wheel chock 300 relative to the surface on which it is being used. More specifically, minimizing the height of the wheel chock 300 reduces the risk of tripping on the wheel chock when it is installed on a surface. In at least one embodiment of the present disclosure, the height of the wheel chock 300 can be, for example, less than one inch. A height of less than one inch may be preferable in embodiments wherein the wheel chock is being used, for example, for a caster wheel, such as that of a server rack. In alternative embodiments, it is possible for the height of the wheel chock 300 to be equal to or greater than one inch while maintaining the objective of minimizing the profile of the wheel chock 300 relative to the surface on which it is being used. For example, in embodiments wherein the wheel chock is being used for a wheel of a passenger vehicle or of a semi-truck, the height of the wheel chock 300 is increased to enable efficacy of the wheel chock 300 while still minimizing its profile to the extent possible. Accordingly, the height of the wheel chock 300 may depend in part on the intended use of the wheel chock 300, but is still selected to minimize the profile of the wheel chock 300 to the extent possible.

Figure 3D:
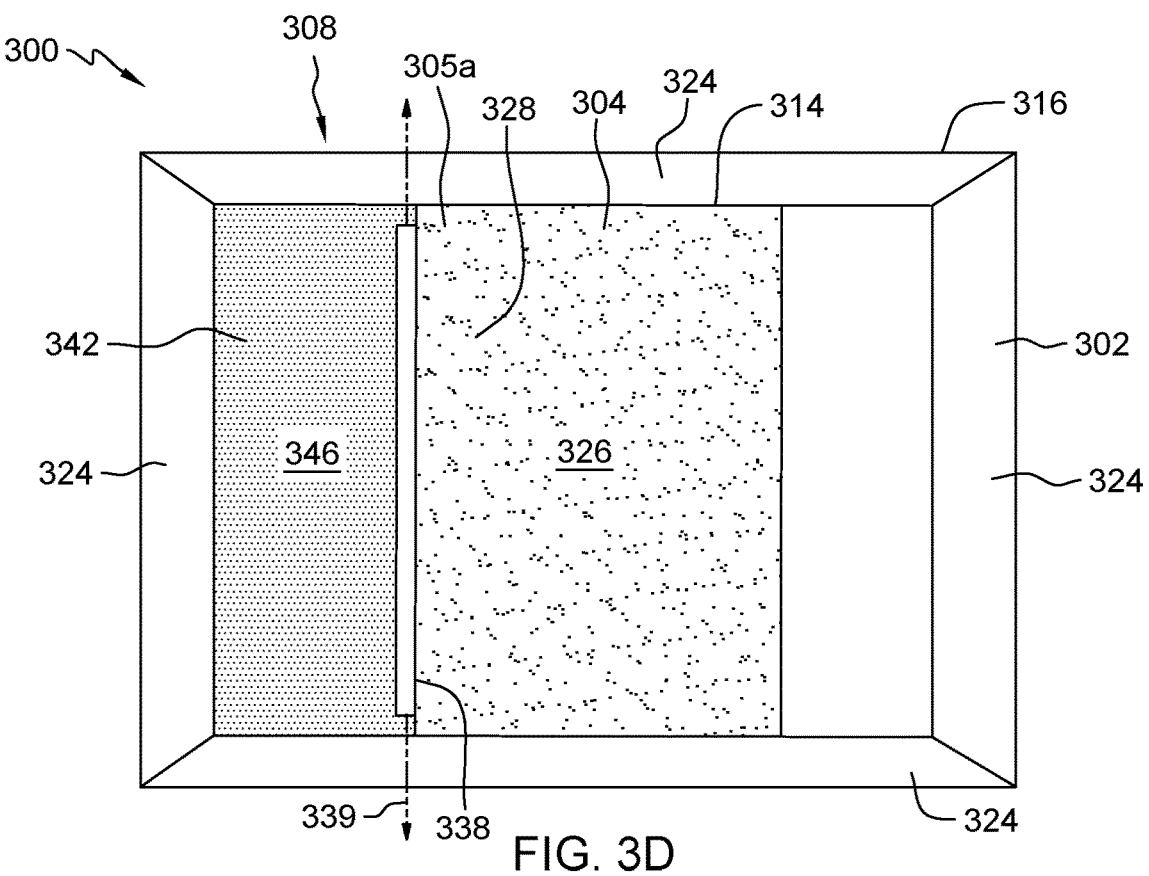
FIG. 3D illustrates a top view of the example embodiment of the chocking device of FIG. 3A in the undeployed configuration, in accordance with embodiments of the present disclosure.
Figure 3E:
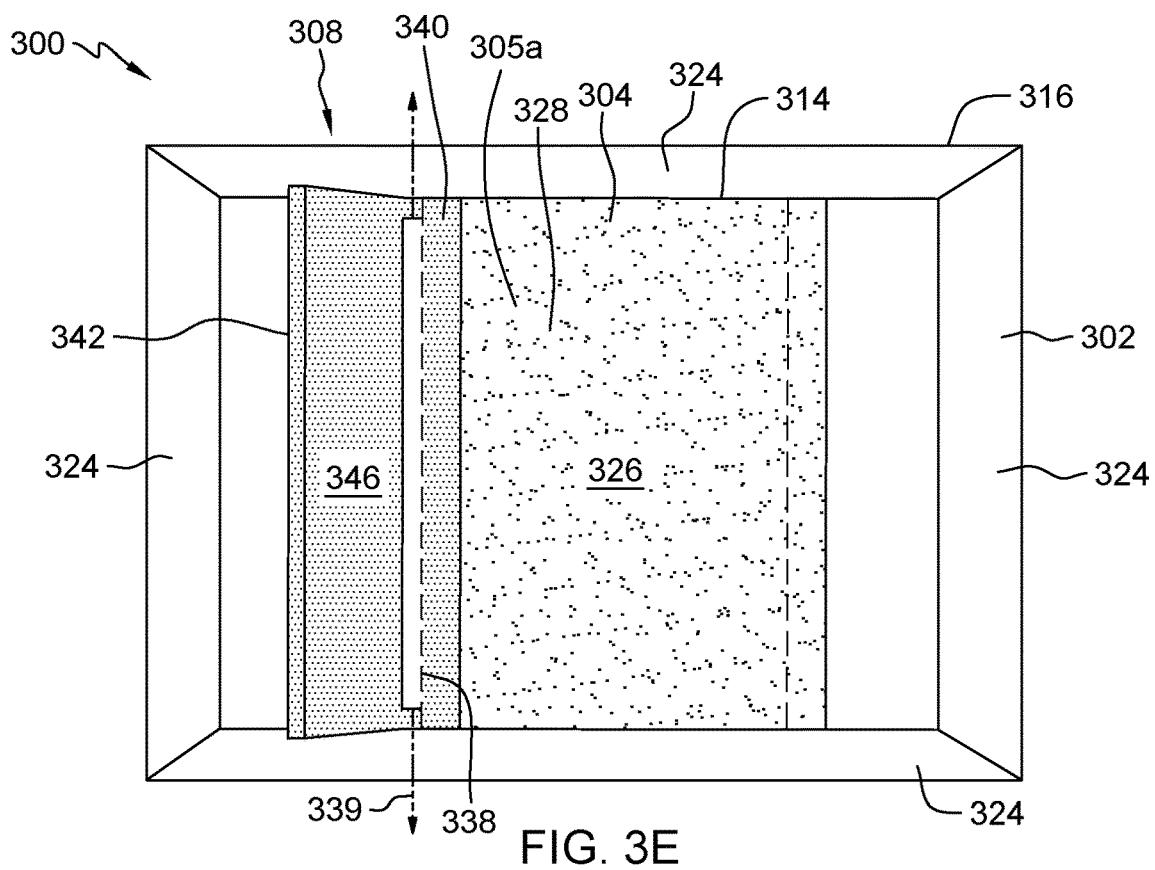
FIG. 3E illustrates a top view of the example embodiment of the chocking device of FIG. 3A in the deployed configuration, in accordance with embodiments of the present disclosure.

As shown in FIGS. 3D and 3E, the greatest vertical extents of the frame 302 in the upward and downward directions along the vertical axis 320 are edges. Therefore, each of the uppermost surface 314 and the lowermost surface 316 is also an edge. The terms "surface" and "edge," as used herein, are not mutually exclusive as an edge can also be a continuous layer arranged at a greatest vertical extent of an object. In alternative embodiments of the present disclosure, the uppermost surface 314 and the lowermost surface 316 may not be edges.

Each of the uppermost surface 314 and the lowermost surface 316 of the frame 302 is substantially planar. As used herein, the term "substantially planar" refers to a surface that substantially lies entirely on a single geometric plane. Accordingly, the lowermost surface 316 is also substantially parallel to the uppermost surface 314. In alternative embodiments of the present disclosure, the lowermost surface 316 may not be substantially parallel to the uppermost surface 314.

The frame 302 also includes four sides 324, arranged in the manner of a standard photo frame. In particular, each of the sides 324 extends from the uppermost surface 314 to the lowermost surface 316 and is angled outwardly from the uppermost surface 314 to the lowermost surface 316. In other words, the sides 324 are nearer to one another at the uppermost surface 314 than at the lowermost surface 316. In this manner, the frame 302 is tapered from the lowermost surface 316 to the uppermost surface 314. In the embodiment shown, the uppermost surface 314 of the frame 302 is also the uppermost extent of each of the four sides 324, and the lowermost surface 316 of the frame 302 is also the lowermost extent of each of the four sides 324.

As shown in FIGS. 3D and 3E, in a projection of the wheel chock 300 along the vertical axis 320 (shown in FIGS. 3A-3C), the entirety of each of the plate 304, the deployment mechanism 306, the stop mechanism 308, the lock mechanism 310, and the return mechanism 312 is arranged within the frame 302. In other words, none of the plate 304, the deployment mechanism 306, the stop mechanism 308, the lock mechanism 310, and the return mechanism 312 extends outwardly beyond the sides 324 of the frame 302. This arrangement ensures that a transition of an object onto any part of the wheel chock 300 passes over a tapered side 324 of the frame 302, thereby reducing the chance of an object being inadvertently caught on or tripped by the wheel chock 300.

Additionally, as shown in FIG. 3A, in a projection of the wheel chock 300 orthogonal to the vertical axis 320, substantially the entirety of each of the plate 304, the deployment mechanism 306, the stop mechanism 308, the lock mechanism 310, and the return mechanism 312 is arranged within the frame 302 when the wheel chock 300 is in an undeployed configuration. In other words, when the wheel chock 300 is in an undeployed configuration, none of the plate 304, the deployment mechanism 306, the stop mechanism 308, the lock mechanism 310, and the return mechanism 312 extends vertically beyond the uppermost and lowermost surfaces 314, 316 of the frame 302. This arrangement enables the profile of the wheel chock 300 to be as low as that of the frame 302, thereby also reducing the chance of an object being inadvertently caught on or tripped by the wheel chock 300.

In the embodiment of the wheel chock 300 shown in FIGS. 3A-3C, a portion of the stop mechanism 308 extends slightly vertically beyond the uppermost surface 314 of the frame 302. In alternative embodiments, however, the entirety of the stop mechanism 308 can be arranged within the frame 302 when the wheel chock 300 is in the undeployed configuration.

Whereas the frame 302 provides exterior physical boundaries of the wheel chock 300, the plate 304 provides a means of activation of the wheel chock 300. In other words, the plate 304 enables operation of the wheel chock 300 by effecting movement of the wheel chock 300 between the undeployed configuration and the deployed configuration. As used herein, the term "undeployed configuration" refers to an initial or resting configuration of a device prior to deployment or activation. Accordingly, the configuration of the wheel chock 300 shown in FIGS. 3A and 3D, prior to activation by a wheel or tire, is the undeployed configuration of the wheel chock 300. In contrast, as used herein, the term "deployed configuration" refers to a resulting or consequential configuration of a device following deployment or activation. In some embodiments, the deployed configuration may refer to a final configuration of a device and/or a configuration of a device that has been activated or deployed to its greatest possible extent. Accordingly, the configuration of the wheel chock 300 shown in FIGS. 3C and 3E, after activation by a wheel or tire, is the deployed configuration of the wheel chock 300. The term "intermediate configuration" refers to any configuration between the deployed configuration and the undeployed configuration (i.e., any configuration while the chock is transitioning from deployed to undeployed or from undeployed to deployed). Accordingly, the configuration of the wheel chock 300 shown in FIG. 3B is an intermediate configuration of the wheel chock 300.

As shown in FIG. 3A, when the wheel chock 300 is in the undeployed configuration, the plate 304 of the wheel chock 300 is substantially flush with the uppermost surface 314 of the frame 302. More specifically, the plate 304 includes a contact surface 326, which is that surface of the plate 304 that is contacted by a wheel or tire during use of the wheel chock 300. Accordingly, the contact surface 326 is the uppermost surface of the plate 304. Thus, when the wheel chock 300 is in the undeployed configuration, the contact surface 326 of the plate 304 is substantially flush with the uppermost surface 314 of the frame 302.

In the embodiment shown, the contact surface 326 is substantially planar. As such, when the wheel chock 300 is in the undeployed configuration and the contact surface 326 of the plate 304 is substantially flush with the uppermost surface 314 of the frame 302, the contact surface 326 is also substantially parallel to the uppermost surface 314. In some alternative embodiments, the contact surface 326 may not be substantially planar. In such embodiments, the contact surface 326 may be flush with the uppermost surface 314 without being parallel to the uppermost surface 314 of the frame.

In the embodiment shown, when the wheel chock 300 is in the undeployed configuration, the substantially planar contact surface 326 may also be described as being substantially coextensive with the uppermost surface 314 of the frame 302. As used herein, surfaces are considered "coextensive" when the greatest extent of each surface is equal or coincident in a common direction. In some alternative embodiments, the contact surface 326 of the plate 304 may be coextensive with the uppermost surface 314 of the frame 302 without also being flush with the uppermost surface 314.

In the embodiment shown, when the wheel chock 300 is in the undeployed configuration, the substantially planar contact surface 326 may also be described as being substantially coplanar with the uppermost surface 314 of the frame 302. As used herein, the term "coplanar" refers to two planar surfaces which lie in a common geometric plane. In embodiments wherein the uppermost surface 314 of the frame 302 and the contact surface 326 of the plate 304 are both substantially planar, if the two surfaces 314, 326 are substantially flush, then they are also substantially coplanar. However, in some alternative embodiments, the contact surface of the plate 304 may be flush with the uppermost surface 314 of the frame 302 without also being coplanar with the uppermost surface 314.

The plate 304 further includes an operating region 328. The operating region 328 of the plate 304 is arranged at or is part of an end 305a of the plate 304 that is arranged nearest to the stop mechanism 308. As used herein, the term "end" refers to a portion or area of an object that includes a terminating edge of the object. Accordingly, as shown in FIGS. 3A-3E, the end 305a of the plate 304 includes a terminating edge of the plate 304. Each of the end 305a and the operating region 328 of the plate 304 extends to and incorporates a portion of the contact surface 326 as well as a portion of a surface of the plate 304 that is arranged opposite the contact surface 326.

As described in further detail below, the operating region 328 of the plate 304 is arranged to overlap with a portion of the stop mechanism 308 such that depression of the plate 304 actuates the deployment mechanism 306, which enables actuation of the stop mechanism 308. As used herein, the term "overlap" refers to the relative position of an object with respect to something else, wherein an object is positioned so as to extend over and cover a part of something else. Accordingly, as shown in FIGS. 3A-3C, the operating region 328 of the plate 304 is positioned relative to the stop mechanism 308 such that the operating region 328 extends over and covers a part of the operating region 328. As a result, in a view of the wheel chock 300 projected along the vertical axis 320 and viewed from above looking toward the contact surface 326 of the plate 304, the operating region 328 of the plate 304 obscures a portion of the stop mechanism 308.

The plate 304 is coupled to the deployment mechanism 306 such that arrangement of a wheel or tire on the plate 304 actuates the deployment mechanism 306. In the embodiment shown, the deployment mechanism 306 is a four bar linkage system which pivots such that vertical movement of the plate 304 relative to the frame 302 is coincident with lateral movement of the plate 304 relative to the frame 302. More specifically, the deployment mechanism 306 includes four bar linkages 330, each of which is arranged near a corner of the plate 304. Because FIGS. 3A-3C illustrate a side view of the wheel chock 300, only two of the bar linkages 330 are visible. The additional two bar linkages are aligned with the two that are visible in FIGS. 3A-3C on the opposite corners of the plate 304.

Each bar linkage 330 includes a first pivot point 332, a second pivot point 334, and a link 336. The first pivot point 332 and the second pivot point 334 of each bar linkage 330 are coupled to one another by the link 336 of the same bar linkage 330, and the first pivot point 332 of each bar linkage 330 is arranged nearer to the stop mechanism 308 than is the second pivot point 334 of the same bar linkage 330. Conversely, the second pivot point 334 of each bar linkage 330 is arranged nearer to the return mechanism 312 than is the first pivot point 332 of the same bar linkage 330. The first pivot point 332 of each bar linkage 330 is pivotably coupled to the plate 304 and the second pivot point 334 of each bar linkage 330 is pivotably coupled to the frame 302. Accordingly, the plate 304 is indirectly coupled to the frame 302 by the four bar linkages 330 of the deployment mechanism 306.

Due to this arrangement, when the plate 304 is depressed or moved vertically downwardly by the weight carried by a wheel or tire arranged on the wheel chock 300, each bar linkage 330 pivots relative to the frame 302 about the second pivot point 334 such that the plate 304 also moves laterally relative to the frame 302. In alternative embodiments, the deployment mechanism 306 may be a different mechanism which operates such that when the plate 304 is moved vertically relative to the frame 302, the plate 304 also moves laterally relative to the frame 302.

The stop mechanism 308 is pivotably coupled to the frame 302 at a stop shaft 338 and includes an operating portion 340 and a stopping portion 342. The stop shaft 338 is rotatable relative to the frame 302 about a stop shaft axis 339 that is orthogonal to the vertical axis 320. The operating portion 340 and the stopping portion 342 are arranged on opposite ends of the stop mechanism 308 relative to the stop shaft 338. More specifically, the operating portion 340 is arranged on one side of the stop shaft 338, nearest to the plate 304, and the stopping portion 342 is arranged on the other side of the stop shaft 338, farthest from the plate 304.

Each of the operating portion 340 and the stopping portion 342 is substantially plate shaped. Accordingly, the operating portion 340 has a substantially planar operating surface 344, and the stopping portion 342 has a substantially planar stopping surface 346. The stop mechanism 308 is configured such that the entirety of the stop mechanism 308 is pivotable relative to the frame 302, but the operating portion 340 and the stopping portion 342 are positionally fixed relative to one another.

The stop mechanism 308 is arranged such that the operating portion 340 is adjacent to the operating region 328 of the plate 304. More specifically, the operating surface 344 of the stop mechanism 308 is at least partially overlapped by the operating region 328 of the plate 304 such that, when viewed in a projection along the vertical axis 320, the operating region 328 at least partially obscures the operating portion 340. Accordingly, when the wheel chock 300 is in any configuration, including the undeployed configuration and the deployed configuration, the operating region 328 of the plate 304 is arranged nearer to the uppermost surface 314 of the frame 302 than is the operating portion 340 of the stop mechanism 308.

As shown in FIG. 3A, the stop mechanism 308 is further arranged such that, when the wheel chock 300 is in the undeployed configuration, the stopping surface 346 is substantially flush with, parallel to, coplanar with, and coextensive with the uppermost surface 314 of the frame 302. In order for the operating surface 344 to be arranged beneath the operating region 328 of the plate 304 while the stopping surface 346 is also arranged substantially flush with the uppermost surface 314 of the frame 302 when the wheel chock 300 is in the undeployed configuration, the operating portion 340 and the stopping portion 342 are arranged at an angle relative to one another. The vertex of the angle between the operating portion 340 and the stopping portion 342 is coincident with the stop shaft axis 339.

The lock mechanism 310 is coupled to the stop mechanism 308 such that rotation of the stop mechanism 308 about the stop shaft 338 operates the lock mechanism 310. More specifically, the lock mechanism 310 includes a kickstand 348, a coupling rod 350, a shaft 352, and a tab 354.

The kickstand 348 is pivotably coupled to the stopping portion 342 of the stop mechanism 308. In particular, a first end of the kickstand 348 is coupled to the stopping portion 342, and a second end of the kickstand 348, which is opposite the first end of the kickstand 348, is free to pivot about the first end such that the angle of the kickstand 348 relative to the stopping portion 342 of the stop mechanism 308 is changeable. As the stopping portion 342 of the stop mechanism 308 rotates about the stop shaft 338, the kickstand 348 rotates about the first end of the kickstand 348 such that the second end of the kickstand 348 is pulled toward the stop shaft axis 339. As the stopping portion 342 pivots to a greater angle relative to the uppermost surface 314 of the plate 304, the second end of the kickstand 348 is translated toward the stop shaft axis 339 such that it supports and maintains the greater angle of the stopping portion 342 relative to the uppermost surface 314 of the plate 304.

As mentioned above, the lock mechanism 310 further includes a coupling rod 350, a shaft 352, and a tab 354, which cooperate to lock the kickstand 348 in place. More specifically, a first end of the coupling rod 350 is positionally fixed to the stop shaft 338 at a fixation point along the circumference of the stop shaft 338. A second end of the coupling rod 350, opposite the first end, is positionally fixed to the shaft 352 at a fixation point along the circumference of the shaft 352. The shaft 352 is rotatable about a shaft axis that is parallel to the stop shaft axis 339. Accordingly, rotation of the stop shaft 338 causes the fixation point of the coupling rod 350 on the circumference of the stop shaft 338 to travel, which is transferred to a translational movement of the coupling rod 350. The translational movement of the coupling rod 350 is transferred to a rotational movement of the shaft 352 via the fixation point of the coupling rod 350 on the circumference of the shaft 352. Accordingly, the shaft 352 is rotated by the coupling rod 350 in the same direction as the stop shaft 338. The coupling rod 350 and shaft 352 of the lock mechanism 310 operate with the stop shaft 338 in a manner similar to that of locomotive wheels that are connected together by a coupling rod so as to co-rotate.

The tab 354 is also positionally fixed to the shaft 352 at a fixation point along the circumference of the shaft 352. Accordingly, rotation of the shaft 352 by the coupling rod 350 causes the fixation point of the tab 354 on the perimeter of the shaft 352 to travel, which rotates the tab 354 into a position which abuts the second end of the kickstand 348 and thereby prevents the kickstand 348 from pivoting back about the first end of the kickstand 348. Accordingly, the lock mechanism 310 prevents the stop mechanism 308 from returning from a deployed configuration (shown in FIGS. 3C and 3E) to an undeployed configuration (shown in FIGS. 3A and 3D).

The return mechanism 312 of the wheel chock 300 is configured to assist the return of the wheel chock 300 from the deployed configuration to the undeployed configuration upon removal of the weight carried by the wheel or tire arranged on the plate 304. In particular, the return mechanism 312 includes a spring 356 arranged on an opposite end of the plate 304 relative to the stop mechanism 308 and the lock mechanism 310. The spring 356 is configured and arranged so as to be compressed by the lateral movement of the plate 304 achieved by the pivoting movement of the four bar linkages 330. Accordingly, when weight carried by a wheel or tire depresses the plate 304 and the plate moves vertically downwardly and laterally in the direction of the return mechanism 312, the spring 356 is compressed and therefore stores potential energy.

Conversely, when the weight carried by the wheel or tire is removed from the plate 304, the potential energy stored in the spring 356 is released, and the spring 356 expands, thereby pressing the plate 304 laterally back toward the stop mechanism 308 and the lock mechanism 310. Due to the four bar linkages 330, lateral movement of the plate 304 back toward the stop mechanism 308 and lock mechanism 310 is coincident with upward vertical movement of the plate 304 to return the contact surface 326 of the plate to a position that is flush with the uppermost surface 314 of the frame 302.

The configuration of the return mechanism 312 of the wheel chock 300 is such that the weight of an average person, or a person carrying something, cannot cause the wheel chock 300 to deploy, but the weight of an automobile or a server rack does cause the wheel chock 300 to deploy. This function of the return mechanism 312 is accomplished by the spring 356, which exerts force on the plate 304 to retain the plate 304 in the undeployed configuration. Accordingly, the weight required to deploy the wheel chock 300 is determined by the properties of the spring 356. Furthermore, the properties of the spring 356 can be adjustable, for example by a tensioner mechanism, such as an adjustment nut, such that the weight required to deploy the wheel chock 300 can be changed. In some embodiments, the properties of the spring 356 can be adjusted, for example, to be deployed by the weight of a motorcycle rather than an automobile.

Thus, the return mechanism 312 prevents unintentional deployment of the wheel chock 300 by a person who steps on the plate 304, which enables use of the wheel chock 300 in a variety of settings without posing a tripping hazard to people moving in the same space as the wheel chock 300 and potentially stepping and walking on the plate 304. The safety of the wheel chock 300 for use in settings wherein people may be stepping and walking on the plate 304 can be further improved, for example, by providing a non-slip surface treatment on the lowermost surface 316 of the frame 302.

In operation, the wheel chock 300 operates to safely and securely hold a wheel or tire in a fixed position and location. In particular, when a wheel or tire is not arranged on the plate 304 of the wheel chock 300, the wheel chock 300 is at rest, also referred to as being in the undeployed configuration. As mentioned above, this configuration is shown in FIGS. 3A and 3D. When the wheel chock 300 is in the undeployed configuration, the plate 304 is in a first plate position, wherein the contact surface 326 is arranged substantially coextensively with the uppermost surface 314 of the frame 302, and the stop mechanism 308 is in a first stop position, wherein the stopping surface 346 is arranged substantially coextensively with the uppermost surface of the frame 302.

When a wheel or tire is arranged on the plate 304 of the wheel chock 300, the weight carried by the wheel or tire depresses the plate 304 vertically downwardly. As shown in FIG. 3B, which depicts the wheel chock 300 in an intermediate configuration between the undeployed configuration and the deployed configuration, the vertical downward movement of the plate 304 causes the operating region 328 of the plate 304 to depress the operating portion 340 of the stop mechanism 308, which it overlaps. As the operating portion 340 of the stop mechanism 308 is pressed downwardly, the stop mechanism 308 pivots about the stop shaft axis 339 of the stop shaft 338. Accordingly, the stopping portion 342 of the stop mechanism 308 is rotated upwardly away from the frame 302 such that the stopping surface 346 is no longer arranged substantially coextensively with the uppermost surface 314 of the frame 302.

Rotation of the stopping portion 342 away from the frame 302 also rotates the kickstand 348 about the first end of the kickstand 348 toward a supporting position. Additionally, rotation of the stop shaft 338 about the stop shaft axis 339 causes rotation of the shaft 352 of the lock mechanism 310 and the rotation of the tab 354 toward the second end of the kickstand 348.

At the same time, the arrangement of the four bar linkages 330 of the deployment mechanism 306 cause the plate 304 to move laterally as it moves vertically downwardly. Accordingly, the spring 356 of the return mechanism 312 is compressed as the plate 304 moves vertically downwardly and laterally.

When the weight of the wheel or tire is fully supported by the plate 304 of the wheel chock 300, the wheel chock 300 is in the deployed configuration shown in FIGS. 3C and 3E. When the wheel chock 300 is in the deployed configuration, the plate 304 is in the second plate position, wherein the contact surface 326 is arranged between the uppermost surface 314 and the lowermost surface 316 of the frame 302, and the stop mechanism 308 is in the second stop position, wherein the stopping portion 342 has been rotated to its greatest angle relative to the uppermost surface 314 of the frame 302. In the deployed configuration, the lowered position of the plate 304 and the angle of the stopping portion 342 relative to the uppermost surface 314 of the frame 302 safely and securely hold the wheel or tire in a fixed position and location within the wheel chock 300. As shown in FIG. 3C, when the wheel chock 300 is in the deployed configuration, the operating region 328 of the plate 304 is still arranged on top of, or overlapping with, the operating portion 340 of the stop mechanism 308.

Additionally, when the wheel chock 300 is in the deployed configuration, the tab 354 is rotated to a position where it abuts the second end of the kickstand 348, thereby preventing lateral movement of the second end of the kickstand 348, thereby preventing rotation of the kickstand 348 about the first end of the kickstand 348. By preventing rotation of the kickstand 348, the tab 354 of the lock mechanism 310 prevents rotation of the stop mechanism 308, thereby locking the wheel chock 300 in the deployed configuration.

To return the wheel chock 300 from the deployed configuration to the undeployed configuration, the wheel or tire is removed from the plate 304. As a result, the spring 356 expands, pressing the plate 304 laterally, back toward the first plate position. Because lateral movement of the plate 304 coincides with vertical movement of the plate 304, as the plate 304 returns to the first plate position, the operating region 328 of the plate 304 releases the downward vertical force on the operating portion 340 of the stop mechanism 308. As the operating portion 340 is free to move upwardly, the stop mechanism 308 is free to rotate about the stop shaft axis 339. Accordingly, the weight of the stopping portion 342 causes the stop mechanism 308 to rotate to return to the undeployed configuration.

More specifically, rotation of the stop mechanism 308 includes rotation of the stop shaft 338 and the stopping portion 342 about the stop shaft axis 339. The rotation of the stop shaft 338 rotates the tab 354 to release the second end of the kickstand 348, and the rotation of the stopping portion 342 presses the second end of the kickstand 348 away from the stop shaft 338. Accordingly, the kickstand 348 no longer supports the stopping portion 342, and the stopping portion 342 is free to rotate downwardly to the position wherein the stopping surface 346 is arranged substantially coextensively with the uppermost surface 314 of the frame 302.

As discussed above, when the wheel chock 300 is in the undeployed configuration, the low profile of the wheel chock 300, the configuration of the wheel chock 300 such that the weight of a person cannot deploy the wheel chock 300, and/or the non-slip surface treatment applied to the lowermost surface 316 of the frame 302 of the wheel chock 300 enable the wheel chock 300 to be used safely and securely in a variety of settings wherein people may be stepping and walking on the plate 304.

In at least one embodiment of the present disclosure, the wheel chock 300 further includes a ramp 380, which provides a surface on which the wheel or tire can gain traction to roll off of the plate 304. The ramp 380 is useful in embodiments of the present disclosure in which the plate 304 translates such that the entire plate 304 moves at the same rate. In such embodiments, such as that shown in FIGS. 3A-3D, when the wheel chock 300 is in the deployed configuration, the ramp 380 allows the wheel or tire to start moving upwardly relative to the frame 302 before the plate 304 has started to return to the first plate position. Accordingly, the ramp 380 is coupled to the frame 302 and to the plate 304 such that when the plate 304 is in the second plate position, the ramp 380 is angled upwardly toward the uppermost surface 314 of the frame 302 and when the plate 304 is in the first plate position, the ramp 380 is substantially parallel to the uppermost surface 314 of the frame 302 and to the contact surface 326 of the plate 304.

Turning now to FIGS. 4A-4D, an example wheel chock 400 is illustrated. The wheel chock 400 includes many similar elements and features that operate in a similar manner to those described above with reference to the wheel chock 300 shown in FIGS. 3A-3E. Accordingly, similar elements are indicated with similar reference numbers. For example, the wheel chock 400 includes a frame 402, which is substantially similar to the frame 302 of wheel chock 300, and a plate 404, which is substantially similar to the plate 304 of wheel chock 300. The wheel chock 400 differs from the wheel chock 300, however, with respect to the manner of deployment and the relative arrangement of some of the elements.

In particular, the wheel chock 400 does not include a bar linkage system such as the four bar linkages 330 included in the deployment mechanism 306. Instead, the deployment mechanism 406 of the wheel chock 400 includes a plate pivot shaft 458 coupled to the plate 404 and to the frame 402 so as to enable the plate 404 to rotate about a plate pivot shaft axis 460 relative to the frame 402. Accordingly, depression of the plate 404 by a wheel or tire rotates the plate 404 about the plate pivot shaft axis 460 such that a first end 405a of the plate 404, which is coupled to the plate pivot shaft 458, remains substantially coextensive with the uppermost surface 414 of the frame 402 while a second end 405b of the plate 404, which is arranged opposite the first end 405a of the plate 404, rotates downwardly away from the uppermost surface 414 of the frame 402. The second end 405b of the plate 404 includes the operating region 428.

The operating region 428 of the plate 404 and the operating portion 440 of the stop mechanism 408 are arranged in a similar manner to that of the wheel chock 300. More specifically, the operating region 428 is arranged on top of, or overlapping, the operating portion 440. Accordingly, as described above with reference to the wheel chock 300, downward movement of the operating region 428 of the plate 404 presses the operating portion 440 of the stop mechanism 408 downwardly, rotating the stop mechanism 408 about the stop shaft 438, and thereby increasing the angle of the stopping portion 442 relative to the frame 402.

The return mechanism 412 of the wheel chock 400 differs from the return mechanism 312 of the wheel chock 300 with respect to the arrangement of the return mechanism 412 relative to other elements of the wheel chock 400. More specifically, the return mechanism 412 is arranged on the same end of the plate 404 as the stop mechanism 408 rather than on the opposite end of the plate 404. In the arrangement of the wheel chock 400, the spring 456 of the return mechanism 412 is compressed by the operating portion 440 of the stop mechanism 408. In particular, as the operating portion 440 is depressed by the operating region 428, and the stop mechanism 408 is thereby rotated about the stop shaft axis 439, the operating portion 440 compresses the spring 456.

Figure 4A:
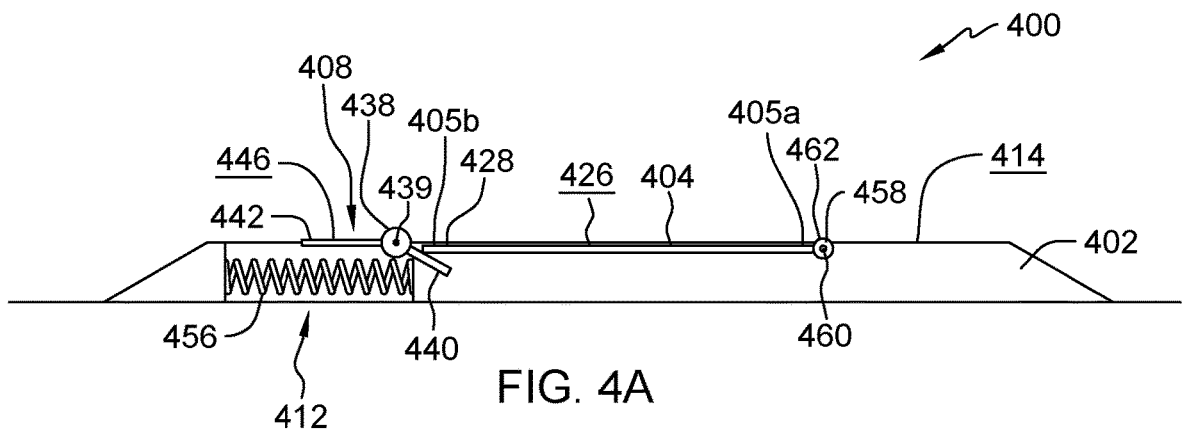
FIG. 4A illustrates a side view of an example embodiment of the chocking device in an undeployed configuration, in accordance with embodiments of the present disclosure.

In operation, when the wheel chock 400 is in an undeployed configuration, as shown in FIG. 4A, the plate 404 is in a first plate position, and the stop mechanism 408 is in a first stop position. More specifically, the contact surface 426 of the plate 404 is substantially flush with, parallel to, coplanar with, and coextensive with the uppermost surface 414 of the frame 402, and the stopping surface 446 of the stop mechanism 408 is also substantially flush with, parallel to, coplanar with, and coextensive with the uppermost surface 414 of the frame 402.

Figure 4B:
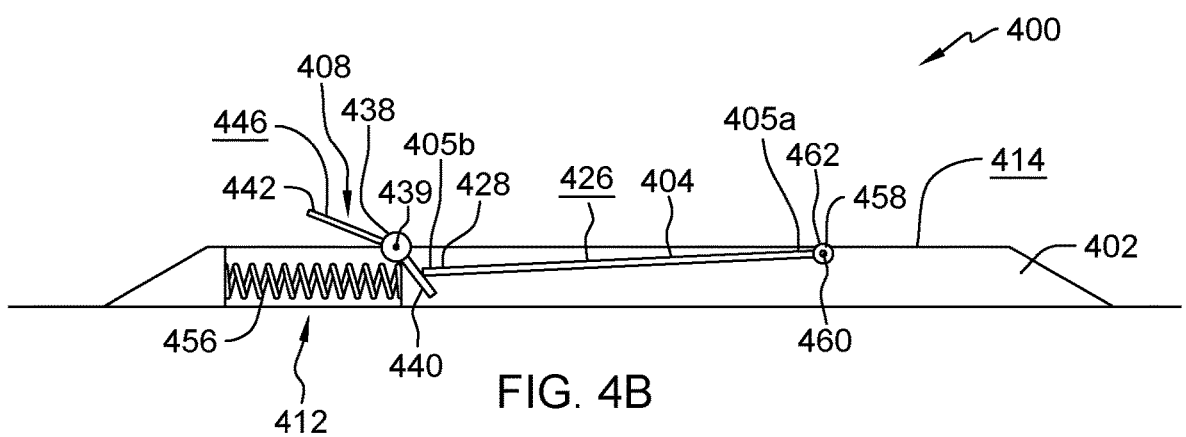
FIG. 4B illustrates a side view of the example embodiment of the chocking device of FIG. 4A in an intermediate configuration, in accordance with embodiments of the present disclosure.

When a wheel or tire is arranged on the contact surface 426 of the plate 404, the plate 404 pivots about the plate pivot shaft axis 460. As shown in FIG. 4B, which depicts an intermediate configuration of the wheel chock 400, as the plate 404 pivots about the plate pivot shaft axis 460, the operating region 428 of the plate 404 depresses the operating portion 440 of the stop mechanism 408. As the operating portion 440 of the stop mechanism 408 is depressed, the stop mechanism 408 is rotated about the stop shaft axis 439. As the stop mechanism 408 is rotated about the stop shaft axis 439, the operating portion 440 compresses the spring 456 and the stopping portion 442 is raised at an increasing angle relative to the uppermost surface 414 of the frame 402.

Figure 4C:
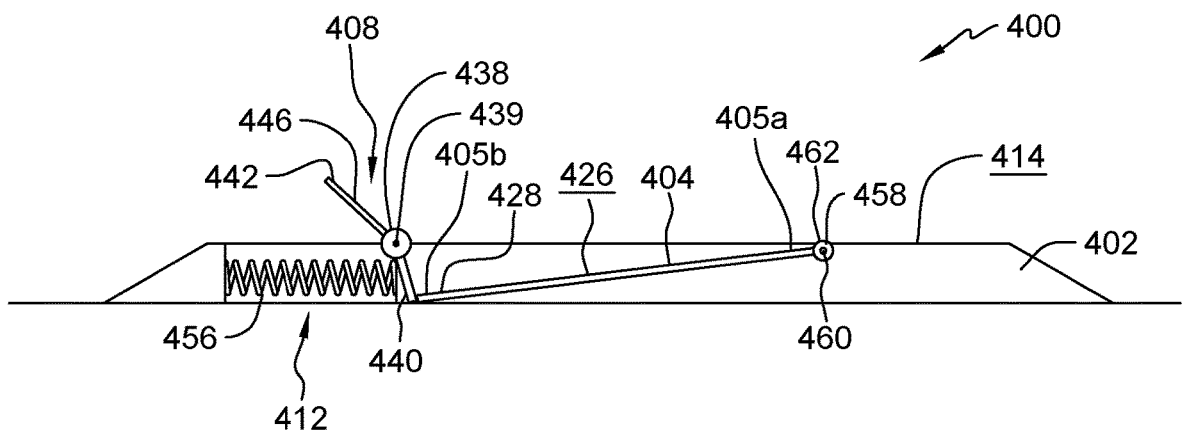
FIG. 4C illustrates a side view of the example embodiment of the chocking device of FIG. 4A in a deployed configuration, in accordance with embodiments of the present disclosure.
Figure 4D:
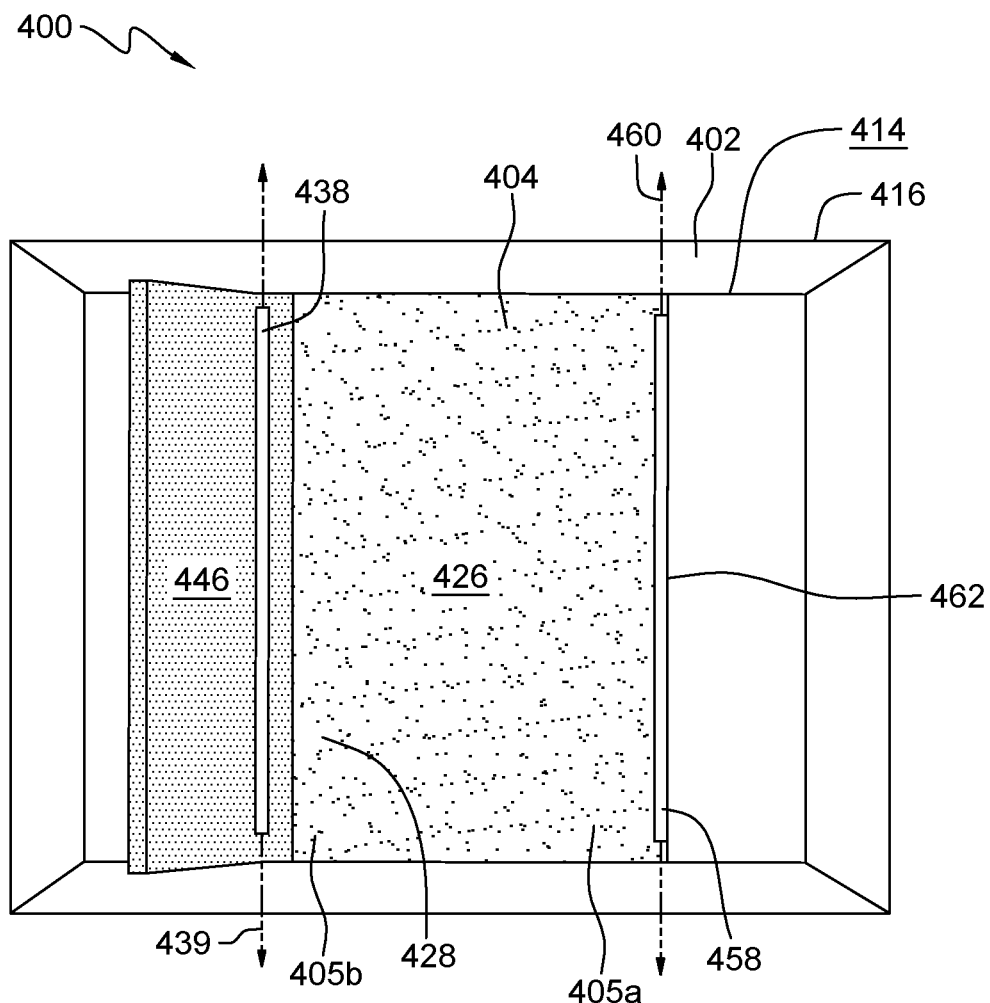
FIG. 4D illustrates a top view of the example embodiment of the chocking device of FIG. 4A, in accordance with embodiments of the present disclosure.

As shown in FIGS. 4C and 4D, when the wheel chock 400 is in the deployed configuration, the plate 404 is in a second plate position, and the stop mechanism 408 is in a second stop position. More specifically, the contact surface 426 of the plate 404 is arranged at an angle and is arranged between the uppermost surface 414 and the lowermost surface 416 of the frame 402. Due to the rotation of the plate 404 about the plate pivot shaft axis 460, the first end 405a of the plate 404 that is coupled to the plate pivot shaft 458 may be substantially coextensive with the uppermost surface 414 of the frame 402, but the plate 404 is not substantially coplanar with, flush with, or parallel to the uppermost surface 414 of the frame 402. Additionally, the operating portion 440 of the stop mechanism 408 is depressed by the operating region 428 of the plate 404, and therefore the operating region 428 of the plate 404 is arranged nearer to the uppermost surface 414 of the frame 402 than is the operating portion 440 of the stop mechanism 408. Additionally, the spring 456 of the return mechanism 412 is fully compressed by the operating portion 440 of the stop mechanism 408.

The return of the wheel chock 400 from the deployed configuration to the undeployed configuration is achieved by removing the wheel or tire from the plate 404 such that the operations and actions performed by the features of the wheel chock 400 can be reversed due to the expansion of the spring 456 of the return mechanism 412.

Wheel chock 400 further includes a tactile bump 462 which stands proud of the uppermost surface 414 of the frame 402. The tactile bump 462 provides physical feedback to the user who is arranging the wheel or tire on the wheel chock 400 to indicate that the wheel or tire is arranged on the plate 404, thereby deploying the wheel chock 400. In the embodiment shown, the tactile bump 462 is provided by the plate pivot shaft 458. However, in alternative embodiments, the tactile bump 462 may be a separate feature of the wheel chock 400 arranged and configured in a manner which provides a physical indication of the arrangement of the wheel or tire on the plate 404. In some embodiments of the present disclosure, the stop shaft 438 can also act as a tactile bump to help indicate to the user that the wheel or tire cannot be moved further onto the plate 404.

Turning now to FIGS. 5A-5D, an example wheel chock 500 is illustrated. The wheel chock 500 includes many similar elements and features that operate in a similar manner to those described above with reference to the wheel chock 400 shown in FIGS. 4A-4D. Accordingly, similar elements are indicated with similar reference numbers. For example, the wheel chock 500 includes a plate 504, which is substantially similar to the plate 404 of the wheel chock 400, and a stop mechanism 508, which is substantially similar to the stop mechanism 408 of wheel chock 400. The wheel chock 500 differs from the wheel chock 400, however, with respect to the manner of deployment and the relative arrangement of some of the elements.

In particular, the frame 502 of the wheel chock 500 does not extend around the entirety of the plate 504. Instead, the frame 502 includes an opening 564 in one of the frame sides 524. The opening 564 extends through the uppermost surface 514 and at least a portion of the side 524 of the frame 502 to enable the plate 504 to pass through the side 524 of the frame 502. In other words, the plate 504 is arranged such that a first end 505a of the plate 504 is arranged outside of the frame 502 and a second end 505b (shown in FIG. 5D) of the plate 504 is arranged inside of the frame 502.

Figure 5A:
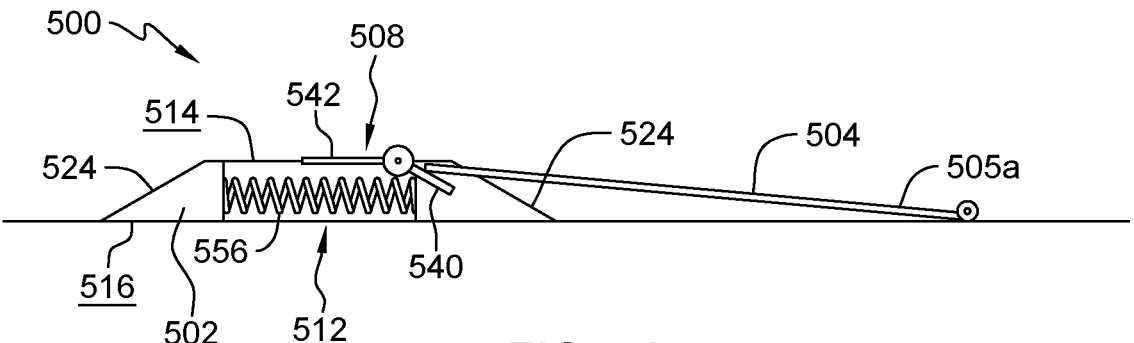
FIG. 5A illustrates a side view of an example embodiment of the chocking device in an undeployed configuration, in accordance with embodiments of the present disclosure.

In the undeployed configuration, shown in FIG. 5A, when the plate 504 is in a first plate position, the plate 504 is angled relative to the uppermost surface 514 of the frame 502. More specifically, the first end 505a of the plate 504, which is arranged outside of the frame 502, is substantially coextensive with the lowermost surface 516 of the frame 502. In other words, in use, both the first end 505a of the plate 504 and the lowermost surface 516 of the frame 502 are arranged on the ground or on the surface on which the wheel chock 500 has been placed. This arrangement of the plate 504 accomplishes the smooth transition onto the plate 504 without the tapered side 524 of the frame 502, since the first end 505*a* of the plate 504 is arranged outside of the frame 502. The second end 505*b* of the plate 504, which is arranged inside the frame 502, is substantially coextensive with the uppermost surface 514 of the frame 502. The second end 505*b* of the plate 504 includes the operating region 528.

The wheel chock 500 does not include a plate pivot shaft such as the plate pivot shaft 458 of the deployment mechanism 406. Instead, the deployment mechanism 506 of the wheel chock 500 relies on the rotation of the plate 504 about the first end 505*a* of the plate 504. More specifically, as shown in FIG. 5B, which illustrates the wheel chock 500 in an intermediate configuration, as the wheel or tire is moved along the contact surface 526 of the plate 504 toward the stop mechanism 508, the weight carried by the wheel or tire depresses the plate 504, decreasing the angle of the plate 504 relative to the frame 502 and thereby lowering the second end 505*b* of the plate 504 through the opening 564.

Figure 5B:
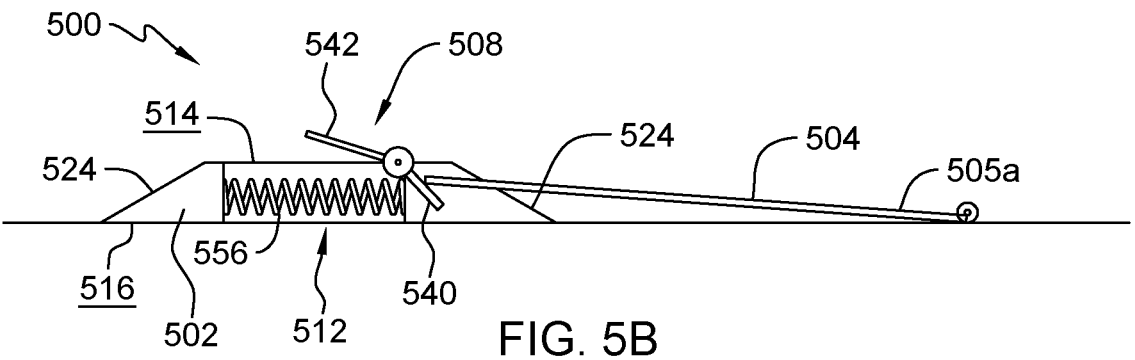
FIG. 5B illustrates a side view of the example embodiment of the chocking device of FIG. 5A in an intermediate configuration, in accordance with embodiments of the present disclosure.

As further illustrated by FIG. 5B, as the second end 505*b* of the plate 504 is lowered through the opening 564, the operating region 528 of the plate 504, which overlaps the operating portion 540 of the stop mechanism 508, presses the operating portion 540 downwardly. Rotation of the plate 504 thereby rotates the stop mechanism 508, which raises the stopping portion 542 relative to the uppermost surface 514 of the frame 502 and compresses the spring 556 of the return mechanism 512.

Figure 5C:
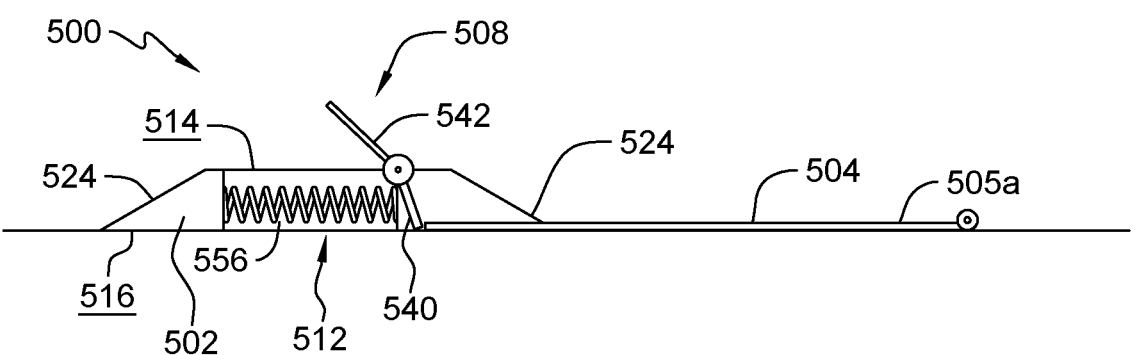
FIG. 5C illustrates a side view of the example embodiment of the chocking device of FIG. 5A in a deployed configuration, in accordance with embodiments of the present disclosure.
Figure 5D:
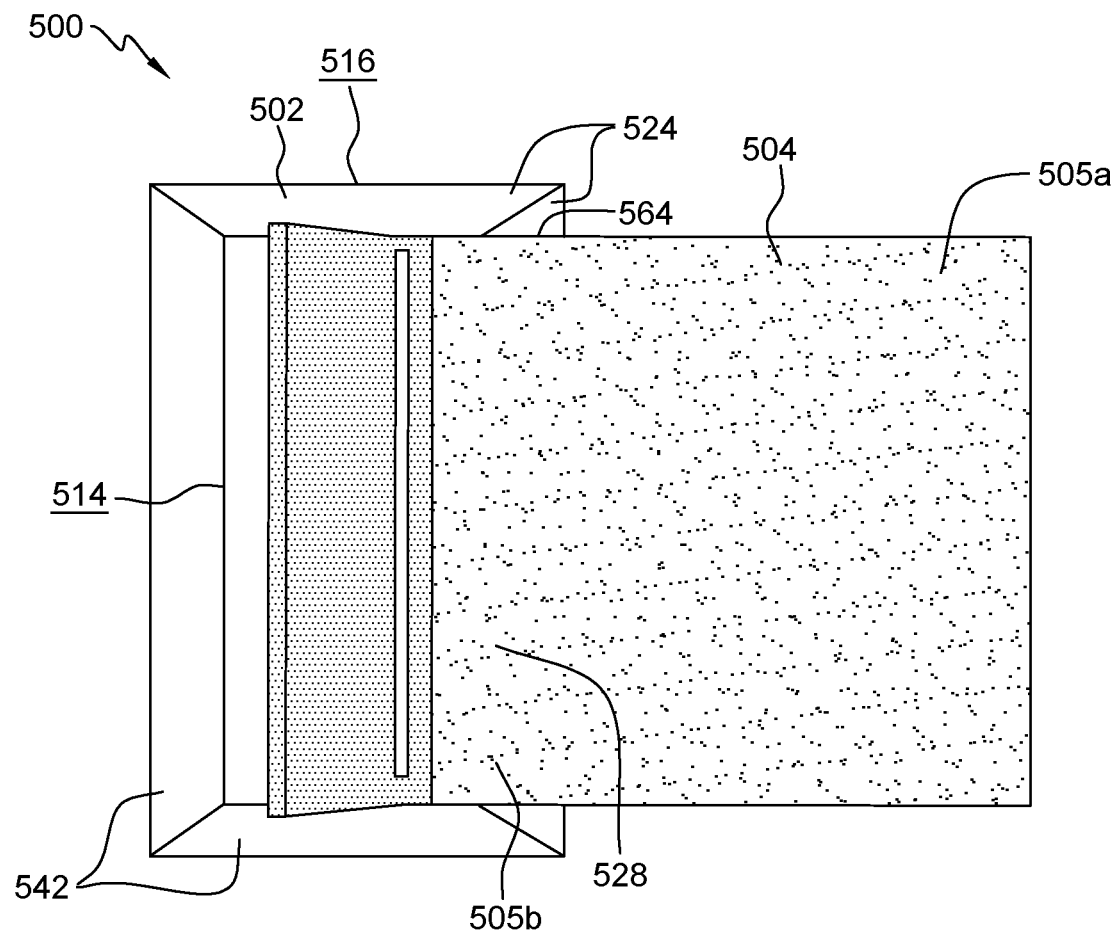
FIG. 5D illustrates a top view of the example embodiment of the chocking device of FIG. 5A, in accordance with embodiments of the present disclosure.

As shown in FIGS. 5C and 5D, when the wheel chock 500 is in a deployed configuration, the plate 504 is nearly flat or nearly parallel to the ground or the surface on which the wheel chock 500 is placed. Additionally, the stopping portion 542 of the stop mechanism 508 is arranged at its greatest angle relative to the uppermost surface 514 of the frame 502. Additionally, the spring 556 of the return mechanism 512 is compressed to its greatest extent.

Like the wheel chock 400, the return of the wheel chock 500 from the deployed configuration to the undeployed configuration is achieved by removing the wheel or tire from the plate 504 such that the operations and actions performed by the features of the wheel chock 500 can be reversed due to the expansion of the spring 556 of the return mechanism 512.

Although the illustrations of the wheel chock 400 shown in FIGS. 4A-4D and wheel chock 500 shown in FIGS. 5A-5D do not include a lock mechanism, in alternative embodiments, a lock mechanism similar to lock mechanism 310 of wheel chock 300 can be included in either of wheel chock 400 and wheel chock 500.

Similarly, although the illustrations of the wheel chock 300 shown in FIGS. 3A-3E and wheel chock 500 shown in FIGS. 5A-5D do not include a tactile bump, in alternative embodiments, a tactile bump similar to tactile bump 462 of wheel chock 400 can be included in either of wheel chock 300 and wheel chock 500.

Turning now to FIGS. 6A-6D, an example wheel chock 600 is illustrated. The wheel chock 600 includes many similar elements and features that operate in a similar manner to those described above with reference to the wheel chock 300 shown in FIGS. 3A-3E. Accordingly, similar elements are indicated with similar reference numbers. For example, the wheel chock 600 includes a frame 602, which is substantially similar to the frame 302 of the wheel chock 300, and a plate 604, which is substantially similar to the plate 304 of the wheel chock 300. The wheel chock 600 differs from the wheel chock 300, however, with respect to the manner of deployment and the relative arrangement of some of the elements.

In particular, the wheel chock 600 does not include a bar linkage system such as the four bar linkages 330 included in the deployment mechanism 306. Instead, the deployment mechanism 606 of the wheel chock 600 includes a tab and slot system configured such that depression of the plate 604 by a wheel or tire causes the entire plate 604 to travel along a predefined path relative to the frame 602.

Figure 6A:
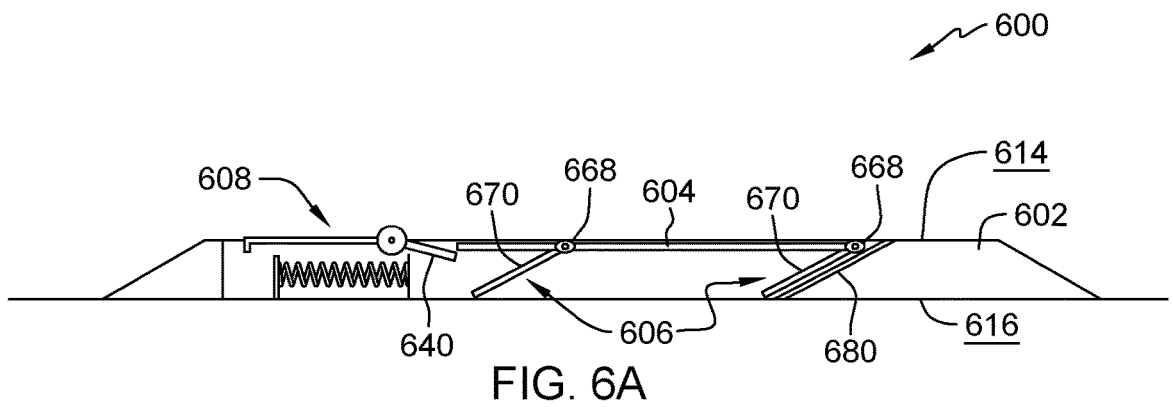
FIG. 6A illustrates a side view of an example embodiment of the chocking device in an undeployed configuration, in accordance with embodiments of the present disclosure.
Figure 6B:
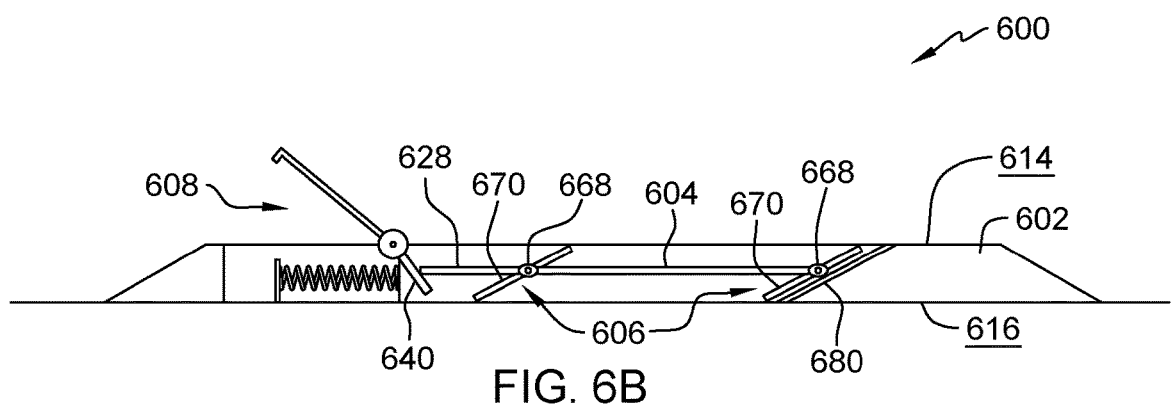
FIG. 6B illustrates a side view of the example embodiment of the chocking device of FIG. 6A in an intermediate configuration, in accordance with embodiments of the present disclosure.
Figure 6C:
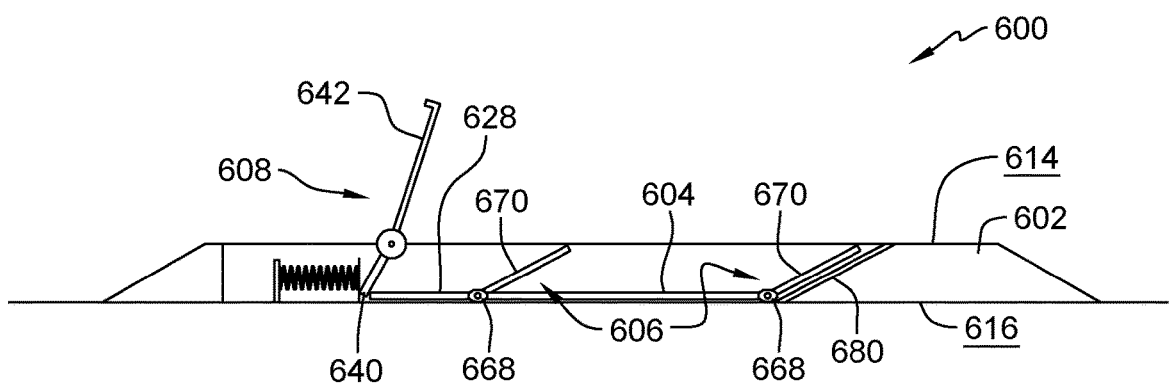
FIG. 6C illustrates a side view of the example embodiment of the chocking device of FIG. 6A in a deployed configuration, in accordance with embodiments of the present disclosure.
Figure 6D:
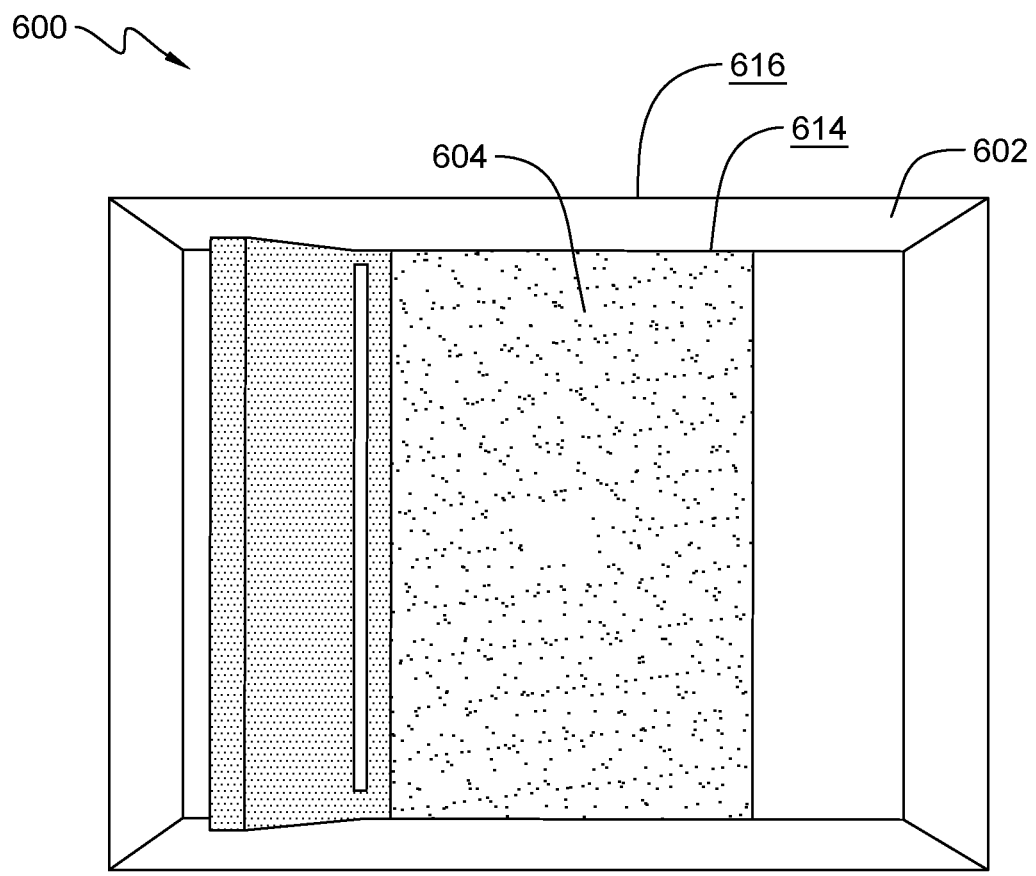
FIG. 6D illustrates a top view of the example embodiment of the chocking device of FIG. 6A, in accordance with embodiments of the present disclosure.

More specifically, the deployment mechanism 606 includes four sliding tabs 668, each of which is arranged along the plate 604 (e.g., near a corner of the plate 604). Because FIGS. 6A-6C illustrate a side view of the wheel chock 600, only two of the sliding tabs 668 are visible. The additional two sliding tabs are aligned with the two that are visible in FIGS. 6A-6C on the opposite side of the plate 604. The deployment mechanism 606 further includes four sliding slots 670 formed in the frame 602. Each sliding slot 670 is configured and arranged to receive one corresponding sliding tab 668 so as to enable the sliding tabs 668 to slide along the path formed by the sliding slots 670.

The sliding slots 670 are angled from the uppermost surface 614 toward the lowermost surface 616 of the frame 602 such that force applied to the plate 604 in a downward vertical direction by a wheel or tire also causes lateral movement of the plate 604 in a direction toward the stop mechanism 608 of the wheel chock 600. Thus, the lateral distance that the plate 604 can travel relative to the frame 602 is greater than that of the plate 304 relative to the frame 302, because the lateral distance is not limited by the space required for rotation of the four bar linkage system. Accordingly, the degree of rotation of the stop mechanism 608 that can be achieved by the wheel chock 600 is greater than that of the stop mechanism 308 of the wheel chock 300, because the greater lateral travel distance of the operating region 628 of the plate 604 causes a greater degree of rotation of the operating portion 640 of the stop mechanism 608.

For example, as shown in FIG. 6C, the wheel chock 600 may be configured such that in the deployed configuration, the stopping portion 642 is rotated more than 90 degrees relative to the uppermost surface 614 of the frame 602. This position of the stopping portion 642 may enable the wheel chock 600 to provide a more robust mechanism for safely and securely holding a wheel or tire in a fixed position and location relative to the wheel chock 300 because it will be more difficult for the wheel or tire to roll over the stopping portion 642 when the wheel chock 600 is in the deployed configuration.

In at least one embodiment of the present disclosure, the wheel chock 600 further includes a ramp 680, which is substantially similar to the ramp 380 of the wheel chock 300. Like the ramp 380, the ramp 680 is useful in embodiments of the present disclosure in which the plate 604 translates such that the entire plate 604 moves at the same rate. In such embodiments, such as that shown in FIGS. 6A-6D, when the wheel chock 600 is in the deployed configuration, the ramp 680 allows the wheel or tire to start moving upwardly relative to the frame 602 before the plate 604 has started to return to the first plate position. In this embodiment, the ramp 680 is rotatably fixed relative to the frame 602 and the plate 604. In at least one embodiment of the present disclosure, the ramp 680 can be fixed at the same angle as the slots 670.

In addition to embodiments described above, other embodiments having fewer elements, more elements, or different elements are contemplated. Also, some embodiments may perform some or all of the functions of the above described elements in a different manner. Furthermore, multiple functions described above may be performed by more or fewer elements. The elements are listed and described illustratively according to an embodiment and are not meant to indicate necessity of a particular element or exclusivity of other potential elements (or functions/purposes as applied to a specific element).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to elements, means one or more elements. For example, "a number of different types of networks" is one or more different types of networks.

When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any elements or element structures illustrated or described herein are examples only, and in other embodiments, different elements may be used. In addition, any element may be combined with another element, so that separate element structures may not be necessary. The previous detailed description is, therefore, not to be taken in a limiting sense.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A chocking device, comprising:
 a frame having an uppermost surface and a lowermost surface, the lowermost surface arranged opposite the uppermost surface;
 a plate having a contact surface, the plate movable between a first plate position, wherein a portion of the contact surface is arranged substantially coextensively with the uppermost surface of the frame, and a second plate position, wherein the portion of the contact surface is arranged between the uppermost surface and the lowermost surface of the frame;
 a stop coupled to the frame and arranged in direct contact with the plate, the stop rotatable such that movement of the plate from the first plate position to the second plate position rotates the stop from a first stop position to a second stop position; and
 a deployment mechanism coupling the plate to the frame, the deployment mechanism including:
  a plurality of slots formed in the frame; and
  a plurality of tabs, each tab fixedly coupled to the plate, each tab configured to slide in a respective slot of the plurality of slots, wherein:

the plate is movable such that the contact surface when the plate is in the first plate position is substantially parallel to the contact surface when the plate is in the second plate position.

2. The chocking device of claim 1, wherein the contact surface is substantially coplanar with the uppermost surface of the frame when the plate is in the first plate position.

3. The chocking device of claim 1, wherein:
each of the slots is angled from the uppermost surface toward the lowermost surface of the frame such that sliding each of the tabs within the respective slot translates the plate vertically and laterally.

4. The chocking device of claim 1, further comprising:
a return mechanism configured to move the plate from the second plate position toward the first plate position, wherein the return mechanism is arranged between the uppermost surface and the lowermost surface of the frame.

5. The chocking device of claim 4, wherein:
the return mechanism includes a spring, and
the return mechanism is coupled to the stop such that rotation of the stop from the first stop position to the second stop position compresses the spring.

6. The chocking device of claim 5, wherein:
the stop includes an operating portion arranged in direct contact with the plate, and
the return mechanism is arranged in direct contact with the operating portion of the stop.

7. The chocking device of claim 6, wherein:
a first side of the operating portion is arranged in direct contact with the plate, and
a second side of the operating portion, opposite the first side of the operating portion, is arranged in direct contact with the return mechanism.

8. The chocking device of claim 6, wherein:
the stop includes a stopping portion and a shaft arranged between the stopping portion and the operating portion; and
the shaft is coupled to the frame such that the stop rotates about an axis of the stop.

9. The chocking device of claim 8, wherein the stopping portion and the operating portion are positionally fixed relative to one another.

10. The chocking device of claim 8, wherein the stopping portion is substantially coextensive with the contact surface when the plate is in the first plate position.

11. The chocking device of claim 1, wherein the frame includes sides, which are angled such that the sides are nearer to one another at the uppermost surface and are farther from one another at the lowermost surface.

12. A chocking device, comprising:
a frame having an uppermost surface and a lowermost surface, the lowermost surface arranged opposite the uppermost surface;
a plate having an uppermost surface, the plate movable between a first plate position, wherein the uppermost surface of the plate is arranged substantially coextensively with the uppermost surface of the frame, and a second plate position, wherein the uppermost surface of the plate is arranged between the uppermost surface of the frame and the lowermost surface; and
a stop rotatably coupled to the frame, the stop having an operating portion arranged nearer to the lowermost surface than the plate is to the lowermost surface when the plate is in the first plate position such that movement of the plate from the first plate position to the second plate position moves the operating portion, wherein:
when the plate is in the first plate position, the uppermost surface of the plate is substantially parallel to the uppermost surface of the frame, and
when the plate is in the second plate position, the uppermost surface of the plate is substantially parallel to the uppermost surface of the frame the plate further includes a bottom surface arranged opposite the uppermost surface of the plate, and
when the plate is in the second plate position, the bottom surface is substantially coextensive with the lowermost surface of the frame.

13. The chocking device of claim 12, wherein the uppermost surface of the plate is substantially coplanar with the uppermost surface of the frame when the plate is in the first plate position.

14. The chocking device of claim 12, further comprising:
a deployment mechanism coupling the plate to the frame, the deployment mechanism including:
a plurality of slots formed in the frame; and
a plurality of tabs, each tab fixedly coupled to the plate, each tab configured to slide in a respective slot of the plurality of slots.

15. The chocking device of claim 14, wherein:
each of the slots is angled from the uppermost surface of the frame toward the lowermost surface of the frame such that sliding each of the tabs within the respective slot translates the plate vertically and laterally.

16. A chocking device, comprising:
a frame having an uppermost surface, a lowermost surface, and a plurality of sides, each side extending from the uppermost surface to the lowermost surface, each side including at least one slot angled from a first end nearer to the uppermost surface toward a second end nearer to the lowermost surface;
a plate including a plurality of tabs, each tab arranged and configured so as to extend into a respective slot of the frame, the plate having a substantially planar contact surface, the plate movable between a first plate position, wherein a portion of the contact surface is arranged substantially coextensively with the uppermost surface of the frame and each tab is arranged at the first end of the respective slot, and a second plate position, wherein the portion of the contact surface is arranged between the uppermost surface and the lowermost surface of the frame and each tab is arranged at the second end of the respective slot; and
a stop mechanism coupled to the frame and arranged in direct contact with the plate such that movement of the plate from the first plate position to the second plate position moves the stop mechanism.

17. The chocking device of claim 16, wherein:
the plate includes an operating region,
the stop mechanism includes an operating portion that is arranged nearer to the lowermost surface than the operating region is to the lowermost surface when the plate is in the first plate position, and
the stop mechanism is arranged such that movement of the plate from the first plate position to the second plate position rotates the operating portion.

* * * * *